United States Patent [19]

Healy et al.

[11] Patent Number: 4,751,151
[45] Date of Patent: Jun. 14, 1988

[54] RECOVERY OF CARBON DIOXIDE FROM FUEL CELL EXHAUST

[75] Inventors: Herbert C. Healy, Hebron, Conn.; Matthew Kolodney, Panama City, Fla.; Alexander H. Levy, Bloomfield; John C. Trocciola, Glastonbury, both of Conn.

[73] Assignee: International Fuel Cells Corporation, South Windsor, Conn.

[21] Appl. No.: 939,610

[22] Filed: Dec. 8, 1986

[51] Int. Cl.⁴ .................... H01M 8/18; C25B 5/00
[52] U.S. Cl. .................................. 429/17; 204/101; 204/103; 429/19; 429/20
[58] Field of Search .................... 429/17, 19, 20; 204/101, 103

[56] References Cited

U.S. PATENT DOCUMENTS 3,511,712  5/1970  Giner ........................ 429/14
4,120,787 10/1978  Yargeau .................... 210/26
4,167,457  9/1979  Giner ....................... 204/1 T

FOREIGN PATENT DOCUMENTS 60-165063  8/1985  Japan ........................ 429/17

Primary Examiner—Aaron Weisstuch
Attorney, Agent, or Firm—William W. Jones

[57] ABSTRACT

A gaseous mixture of hydrogen and carbon dioxide is used as the fuel cell fuel or anode gas, and air is used as the oxidant or cathode gas in a nonalkaline fuel cell power plant. In feeding the fuel gas through the anode side of the fuel cell, hydrogen is removed during the electrochemical reaction and the fuel gas which is exhausted from the anode side has a much higher proportion of carbon dioxide to hydrogen than the entering fuel gas. The fuel gas exhaust is fed through a carbon dioxide absorber to remove carbon dioxide from the fuel exhaust. The carbon dioxide is recovered from the absorber for useful purposes and the hydrogen gas leaving the absorber is dewatered and burned in a reformer. Carbon dioxide emissions from the power plant are thus greatly reduced benefiting the environment.

7 Claims, 2 Drawing Sheets

RECOVERY OF CARBON DIOXIDE FROM FUEL CELL EXHAUST

TECHNICAL FIELD

This invention relates to a fuel cell power plant and more particularly, to a nonalkaline fuel cell power plant having facilities for recovering purified carbon dioxide gas from the anode exhaust of the stacks in the plant.

BACKGROUND ART

There are several different general types of fuel cells which can be distinguished one from another primarily by the electrolytes they utilize. For example, there are fuel cells which utilize phosphoric acid, sulfuric acid, fluorinated phosphoric or sulfuric acid or the like acid electrolytes; ion exchange electrolytes; molten carbonate salt electrolytes; solid electrolytes such as doped zirconia or ceria; alkaline electrolytes; and other electrolytes which can be used in the electrochemical electricity-producing reaction. All of these types of fuel cells will use hydrogen as the anode reactant and oxygen as the cathode reactant. The hydrogen will typically come from a fossil fuel which has been catalytically converted to a hydrogen-rich fuel gas, and the oxygen will come from air passed over the cathode side of the cell or cell stack. The converted fuel gas, as noted, will be rich in hydrogen, but will also contain a significant percentage of carbon dioxide. Of the cell stack types identified above, none will be adversely affected by the carbon dioxide component of the fuel gas except for the alkaline stacks. In the alkaline stacks, steps must be taken to remove the carbon dioxide from the converted fuel gas before it passes through the anode side of the stack. Thus, the anode exhaust from an alkaline stack will not contain any appreciable amounts of carbon dioxide. Since the remaining types of cell stacks can tolerate carbon dioxide, there has been no motivation in the prior art to remove carbon dioxide from the anode gases in these nonalkaline fuel cell stack systems.

This invention is directed toward the removal of carbon dioxide from nonalkaline fuel cell stack anode gases. There are two basic reasons why carbon dioxide should be removed from nonalkaline fuel cell stack anode gases. Firstly, such removal will lessen the amount of carbon dioxide emitted into the atmosphere by fuel cell power plants. It is well documented that increases in atmospheric carbon dioxide will result in corresponding increases in mean ambient temperatures, due to the so-called "Greenhouse Effect". It is also common knowledge that conventional electric power generating plants emit significant amounts of carbon dioxide into the atmosphere through their flue stacks. Systems which can be used to scrub the conventional power plant effluents of carbon dioxide are expensive and not particularly efficient due to the low carbon dioxide concentrations. By comparison, fuel cell power plants can be inexpensively and efficiently adapted to provide for carbon dioxide removal from their anode gases. The second reason why carbon dioxide removal in nonalkaline fuel cell power plants is desirable, even though carbon dioxide does not adversely affect operation of such plants, is that the overall operating economies of such modified plants are improved. Carbon dioxide is a useful, saleable product, and it is relatively easy to recover in the fuel cell stack environment. As previously noted, the converted fuel gas will be rich in hydrogen and will also contain a significant amount of carbon dioxide as it enters the stack to pass through the anode side. In passing through the anode side of the stack, the percentage of hydrogen in the fuel gas is markedly reduced as it is used in the electrochemical reaction. Thus, the gas exhausted from the anode side of the stack is still a mixture of hydrogen and carbon dioxide, but the percentage of carbon dioxide is greatly increased, and in fact carbon dioxide is a major constituent and can be present in percentages of up to 50%. The carbon dioxide component of this anode exhaust gas can be easily recovered in the fuel cell stack system by a regenerable absorbant. The heat and internal pressure present in the fuel cell stack environment are particularly conducive to the efficient absorption of carbon dioxide in an absorbant, and the subsequent separation of the carbon dioxide from the absorbant in a regenerator. The carbon dioxide retrieved from the regenerator is then cooled and compressed for further utilization in other applications.

It is therefore an object of this invention to provide an improved nonalkaline fuel cell power plant with lower carbon dioxide emissions.

It is a further object of this invention to provide a power plant of the character described which produces high purity carbon dioxide as a byproduct.

It is another object of this invention to provide a power plant of the character described wherein carbon dioxide in the fuel gases is effectively removed from the plant anode exhaust gases.

It is an additional object of this invention to provide a power plant of the character described wherein carbon dioxide is recovered with an absorbant material which is regenerated within the power plant system.

These and other objects and advantages of the invention will become more readily apparent from the following detailed description of a preferred embodiment of the invention when taken in conjunction with the accompanying drawings.

BEST MODE FOR CARRYING OUT THE INVENTION

Figure 1:
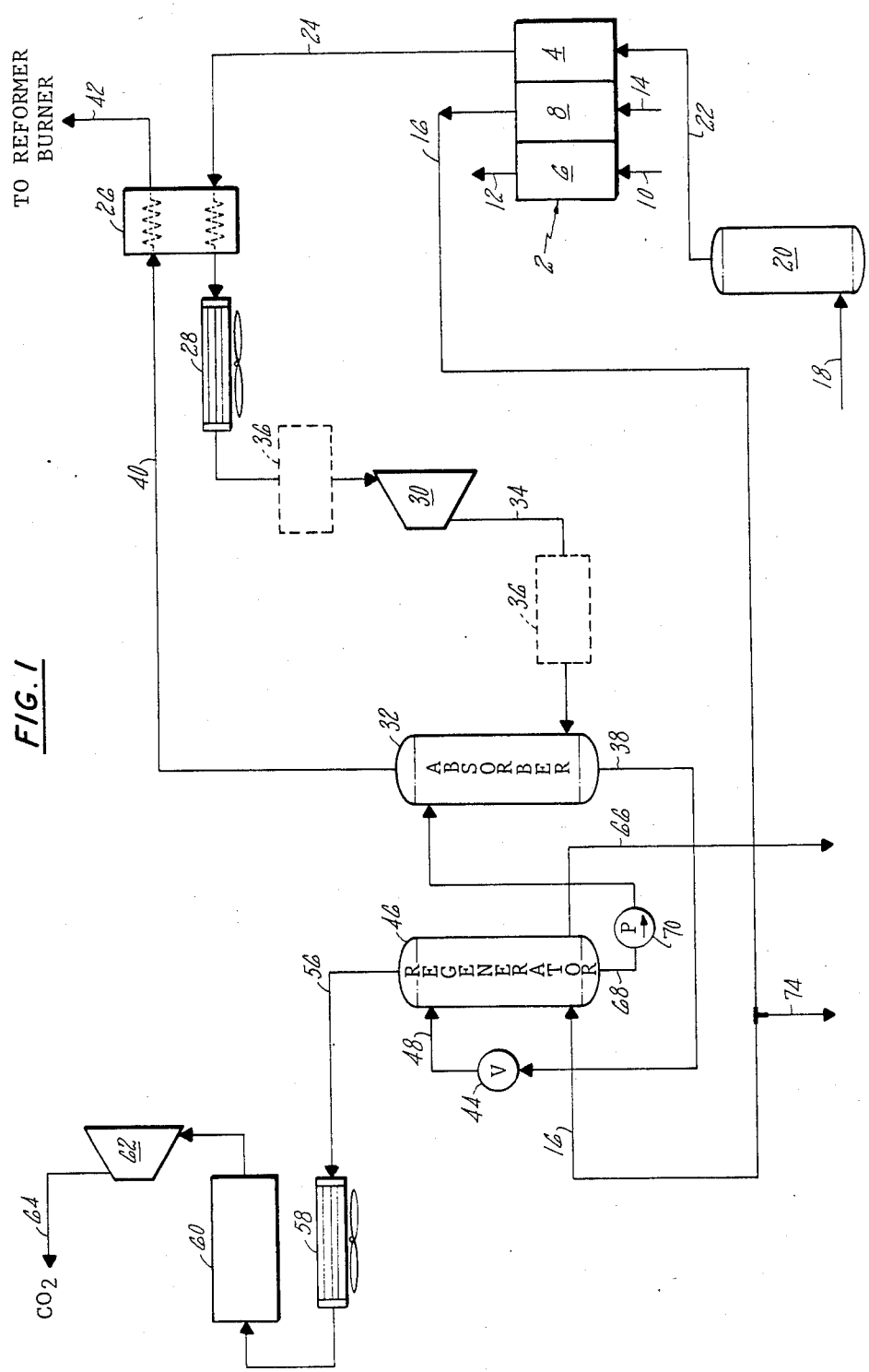
FIG. 1 is a schematic view of a nonalkaline fuel cell power plant system employing typical carbon dioxide recovery equipment in accordance with this invention.

Referring now to the drawings, there is shown in FIG. 1 a schematic representation of an acid fuel cell stack system with provisions for recovering carbon dioxide from the anode exhaust gas. The system includes the acid stack, denoted generally by the numeral 2, which has an anode side 4, a cathode side 6, and a cooling portion 8. It will be understood that the stack 2 is, in fact, made up of a series of platelike elements which are stacked, one atop the other in serial fashion, and wherein some of the plates are compound electrode plates, others are anode or fuel circulating plates, still others are cathode or oxidant circulating plates, and still others are coolant circulating plates. Compressed air is fed into the cathode side 6 of the stack 2 via conduit 10 and oxygen-depleted air and reaction water are exhausted from the cathode side 6 through conduit 12. Water coolant is delivered to the cooling portion 8 of the stack 2 through conduit 14 and a steam/water two phase mixture is exhausted from the cooling portion 8 via conduit 16. The hydrogen rich fuel cas is delivered from conduit 18 to a cooler condenser 20 wherein water is condensed out of the fuel gas. The dry fuel gas is then delivered to the anode side 4 of the stack 2 via conduit 22. The anode fuel gas and the cathode air are kept at substantially the same pressure, which is in the range of about 30 to 300 psi and preferably about 120 psi. As previously noted, the fuel gas entering the anode side 4 from the conduit 22 is rich in hydrogen which is the majority constituent, but also contains a significant minority percentage of carbon dioxide, as for example about 24%. As the fuel gas passes through the anode side 4, it is stripped of much of its hydrogen which is consumed in the electrochemical cell reaction, so that the gas exhausted from the anode side 4 into the conduit 24 is mostly carbon dioxide. Typically, the anode exhaust in an acid fuel cell stack is about 50% carbon dioxide. The anode exhaust gases enter the conduit 24 at a temperature of about 400° F. and a pressure of about 120 psi and are passed through a heat exchanger 26 and cooler 28 where they are cooled to about 200° F., and undergo a pressure drop of about 10 psi. The cooled anode exhaust gases are then compressed to a pressure of about 130 psi by compressor 30 and are delivered to an absorber chamber 32 via conduit 34. It is desirable to admit the anode exhaust gases to the absorber chamber 32 at a temperature of about 230° F., and additional heat exchangers 36 (shown in phantom) may be provided upstream of the absorber chamber 32, if necessary. The absorber chamber 32 preferably contains a liquid carbon dioxide absorbant, such as monoethanolamine (MEA) which circulates downwardly through the chamber 32 to a first outlet conduit 38. The compressed carbon dioxide-rich anode exhaust gas enters the chamber 32 near its bottom and is bubbled upward through the liquid absorbant to a second outlet conduit 40. As the anode exhaust gas bubbles upwardly through the absorbant, carbon dioxide is stripped from the gas by the absorbant so that as the absorbant enters the first outlet conduit 38 it is rich in absorbed carbon dioxide. On the other hand, the gas which has been depleted of carbon dioxide is once more predominantly hydrogen. Typically, the gas in the conduit 40 will be about 57% hydrogen and 10% carbon dioxide with the balance being water vapor and methane. The gas in the conduit 40 passes through the heat exchanger 26 where its temperature is raised to about 365° F. and from whence it is delivered by conduit to the reformer (not shown) to fuel the reformer burner.

Figure 2:
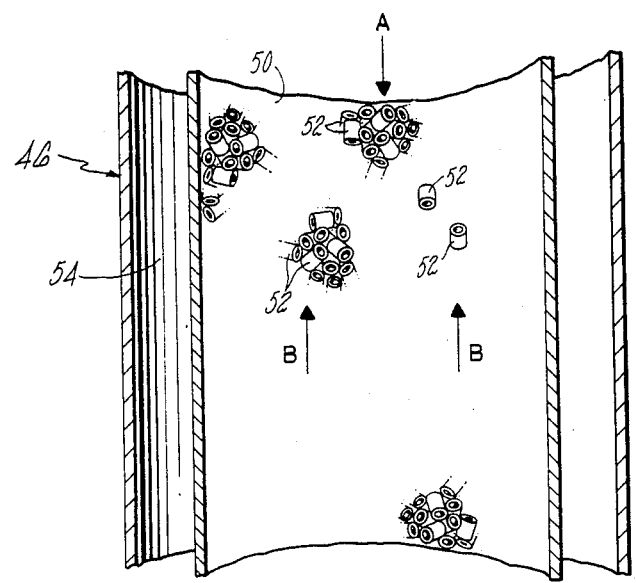
FIG. 2 is a fragmented axial sectional view of the regenerator tower in the plant of FIG. 1.

The carbon dioxide-rich absorbant passes through the conduit 38 past a pressure relief valve 44 where its pressure is dropped to about 15 psi, whereafter it enters the top of the regenerating tower 46 via conduit 48. As will be noted from FIG. 2, the regenerating tower 46 has a hollow interior 50 which is packed with a porous filler material such as the Raschig rings 52 shown in FIG. 2. These are small sleeve-shaped bodies that provide a matrix through which the carbon dioxide enriched absorbant can percolate. The matrix has a large surface area due to the bodies 52 and the absorbant descends through the tower 46 in the direction of the arrow A. About the hollow interior there is disposed a jacket 54 or the like through which the steam and water mixture is fed so as to raise the temperature of the interior 50. It will be noted that the cooling exhaust conduit 16 from the stack 2 ducts the steam and water mixture to the regenerator jacket. The steam and water mixture will preferably be at a temperature of about 350° F. and will heat the interior of the regenerator tower to a comparable temperature. The elevated temperature and reduced pressure in the regenerator tower 46 along with the excessive surface area in the particle matrix causes the absorbant to release the carbon dioxide so that the latter rises through the matrix of bodies 52 in the direction of the arrows B.

Referring back to FIG. 1, the carbon dioxide which rises through the regenerator tower 46 passes into a conduit 56 and thence through coolers 58 and 60 where its temperature is lowered. The cooled carbon dioxide is then compressed to a desired level by compressor 62 and exits the system through conduit 64. The steam/water mixture is removed from the regenerator jacket through conduit 66 and is delivered therefrom to a water treatment station where the water phase is separated from the mixture and treated. The stripped absorbant exits the regenerator tower via a lower outlet conduit 68 and is recycled back to the top of the absorber chamber 32 by a recirculating pump 70.

A portion of the steam/water mixture is bled from the conduit 16 into a branch conduit 74 for delivery to the raw fuel reformer (not shown). By using the carbon dioxide recovery system of this invention, it has been determined that $3 \times 10^5$ lbs. of carbon dioxide can be recovered per day operating an 11 MW acid fuel cell power plant.

It will be readily apparent that the system of this invention adds to the productivity and value of the power plant while, at the same time, providing a positive environmental impact. The carbon dioxide can be recovered at very low added plant installation cost, and with relatively low additional operating costs, such that the recovered carbon dioxide will add to the profitability of the plant. This invention may also provide for carbon dioxide production in heavily populated areas where formerly not possible since restrictions against chemical plants in the more dense population centers will not be applicable to electric power generating plants.

Since many changes and variations of the disclosed embodiment of the invention may be made without departing from the inventive concept, it is not intended to limit the invention otherwise than as required by the appended claims.

We claim:

1. An acid fuel cell power plant system operable to produce carbon dioxide as a by-product, said system comprising:
   (a) fuel cell stack means having anode means, cathode means, and fuel cell cooling means, said cooling means using a water coolant;
   (b) means for delivering a hydrogen-rich fuel gas which contains carbon dioxide to said anode means for consumption of hydrogen by said anode means in an electrochemical reaction in the stack;
   (c) carbon dioxide absorber means including an absorbent for stripping carbon dioxide from gaseous mixtures thereof;
   (d) means for delivering hydrogen-depleted exhaust gas containing carbon dioxide from said anode means to said carbon dioxide absorber means for absorption of carbon dioxide from said exhaust gas;
   (e) an absorbent regenerator;
   (f) means for delivering carbon dioxide-enriched absorbent from said absorber means to said regenerator for separation of carbon dioxide from said absorbent;

(g) means for exhausting carbon dioxide gas from said regenerator, said means for exhausting further including means for cooling and compressing carbon dioxide exhausted from said regenerator; and (h) means for removing the compressed carbon dioxide from the power plant.

2. The system of claim 1 further comprising means for delivering a high temperature water-steam mixture exhausted from said cooling means to said absorbant regenerator to heat the latter to temperatures which enhance separation of carbon dioxide from said absorbant.

3. The system of claim 2 further comprising means for pressurizing said anode and cathode means to substantially equal pressures of about 120 psi.

4. The system of claim 3 further comprising means for pressurizing the anode exhaust gas to a pressure of about 130 psi prior to delivery of said exhaust gas to said absorber means.

5. The system of claim 4 further including means for lowering pressure of the carbon dioxide-enriched absorbant to about 15 psi prior to delivery of the absorbant to said regenerator.

6. The system of claim 5 further comprising recycling conduit means connected to said regenerator and to said absorber means for recycling absorbant from said regenerator to said absorber means after carbon dioxide has been removed from the absorbant.

7. The system of claim 6 further comprising cathode inlet means for delivering pressurized air to said cathode means for consumption of oxygen by said cathode means in the electrochemical reaction in the stack.

* * * * *